US005153041A

United States Patent [19]

Clements et al.

[11] Patent Number: 5,153,041

[45] Date of Patent: Oct. 6, 1992

[54] PAD ASSEMBLY

[75] Inventors: George J. Clements, Afton; John J. Emmel, Blaine, both of Minn.; Andrew C. Lamberson, Hudson, Wis.; Bruce W. Carlson; Scott E. Michel, both of Minneapolis, Minn.; Alden R. Miles, Burnsville, Minn.

[73] Assignee: Minnesota Mining and Manufacturing Company, St. Paul, Minn.

[21] Appl. No.: 595,319

[22] Filed: Oct. 10, 1990

[51] Int. Cl.[5] .......................... B32B 7/06; B32B 7/12; B42D 1/10

[52] U.S. Cl. ........................................ 428/40; 428/77; 428/138; 428/194; 428/202; 281/15.1; 283/63.1; 462/55

[58] Field of Search ................... 428/40, 77, 194, 202, 428/138; 281/15.1; 283/63.1; 462/55

[56] References Cited

U.S. PATENT DOCUMENTS 4,590,109 5/1986 Holmberg ............................ 428/40
4,980,212 12/1990 Marquis et al. ....................... 428/40

*Primary Examiner*—Alexander S. Thomas
*Attorney, Agent, or Firm*—Gary L. Griswold; Walter N. Kirn; William L. Huebsch

[57] ABSTRACT

A pad assembly comprising a multiplicity of flexible sheets each having a band of repositionable pressure sensitive adhesive coated on its rear surface adjacent and spaced by a small predetermined spacing from a first edge. The sheets are disposed in a stack with the band of repositionable pressure sensitive adhesive on each sheet adhering it to the adjacent sheet in the stack; and a layer of padding compound is disposed over and adhered to aligned first edges of the sheets in the stack. The padding compound allows, after the band of repositionable pressure sensitive adhesive on the rear surface of one of the sheets in the stack is separated from the front surface of the adjacent sheet in the stack, that one sheet (and any sheets above it) to be pivoted away from that adjacent sheet while remaining adhered to the adjacent sheets. The small predetermined spacing between the band of repositionable pressure sensitive adhesive and the first edge of each sheet provides a tactile feel when the band of repositionable pressure sensitive adhesive on the rear surface of one of the sheets in the stack separates from the front surface of the adjacent sheet in the stack that signals the person peeling the sheet away that such separation has occurred, and allows that person to reduce the force he is applying to the sheet, thereby restricting inadvertent separation of that sheet from the padding compound. After a sheet is intentionally separated from the padding compound, the band of repositionable pressure sensitive adhesive on the sheet affords adhesion of that sheet to a vertical surface.

12 Claims, 1 Drawing Sheet

PAD ASSEMBLY

TECHNICAL FIELD

The present invention relates to pad assemblies of the type including a multiplicity of aligned flexible sheets in a stack which are attached together along or adjacent aligned edges of the sheets so that any of several uppermost individual sheets in the stack can either (1) be bent or pivoted away from an adjacent underlying sheet so that the underlying sheet can be written on, or (2) be separated from the stack so that the separated sheets can be used elsewhere or disposed of; and in one important aspect, to such pad assemblies that are large in size, and in which the stack is mounted on a stiff back card so that the pad assembly can be supported in a vertical position at the front of a room during a meeting and used to record lists of items or ideas generated during the meeting.

BACKGROUND ART

Many pad assemblies include a multiplicity of aligned flexible sheets (i.e., typically paper sheets) in a stack which are attached together along or adjacent aligned edges of the sheets. Some such pad assemblies are large in size and include a stiff back card on which the stack is mounted so that the pad assembly can be supported at the front of a room on a support such as an easel during a meeting and used to record lists of items or ideas generated during the meeting. During such use, typically one or more of the uppermost sheets on the pad, after being written on, are either (1) bent or pivoted away from an underlying sheet so that they project over and are supported on an upper support edge of the back card and the underlying sheet can be written on, or (2) are separated from the stack so that the separated sheet or sheets can be positioned elsewhere, typically on the walls of the room to which they are attached by means such as a clip, pin or a length of adhesive coated tape so that information on the separated sheets can easily be viewed by the participants of the meeting. In some such pad assemblies the sheets are attached together by a layer of padding compound along the one edge portion which allows the individual sheets to be separated from the padding compound or pivoted away from underlying sheets by bending the layer of padding compound. In the most common type of such pad assemblies the sheets are attached together by staples through portions of the sheets adjacent the aligned edges of the sheets. Such staples more firmly hold the sheets together, but require portions of the sheets around the staples to be bent when the sheets are supported on the support edge and to be torn away when the sheets are removed from the pad; whereas in yet other type of such pad assemblies the sheets are attached together by staples through portions of the sheets adjacent the aligned edges of the sheets and are transversely perforated just below the staples so that the sheets can be torn off along their lines of perforation, or folded along the lines of perforations when the sheets are supported on the support edge.

A pad assembly commercially designated "Clingers" and available from the Ampad Corporation, Holyoke, Md., comprises a multiplicity of flexible sheets disposed in a stack with the corresponding edges of the sheets aligned and with each sheet having a band of repositionable pressure sensitive adhesive coated on its rear surface along aligned first edges of the sheets, and the band of repositionable pressure sensitive adhesive on each sheet adhering it to the front surface of the adjacent sheet in the stack. Sheets removed from the "Clingers" pad assembly can be releasably adhered to a support surface by the bands of repositionable pressure sensitive adhesive on the sheets. Only the top sheet from such a pad assembly can be easily removed, however, which is a significant disadvantage of such a pad assembly compared to the pad assemblies described above from which underlying sheets in the pad can be easily removed prior to removal of the uppermost sheet in the pad. Also, the pressure sensitive adhesive on the sheets from the "Clingers" pad assembly will not stick very long to anything but the smoothest of wall surfaces, such as painted sheet rock and metal surfaces, glass, or the like.

DISCLOSURE OF INVENTION

The present invention provides a pad assembly of the type including a multiplicity of aligned flexible sheets attached together along one edge portion to form a stack from which any of several uppermost individual sheets can either be pivoted away from an adjacent sheet, or can be separated from the stack and releasably adhered to a support surface by repositionable pressure sensitive on the sheet that can adhere well to many rough surfaces; which pad assemblies are particularly useful when made large in size and to include a stiff back card whereby they can be supported at the front of a room during a meeting in a generally vertical position and used to record lists of items or ideas generated during the meeting.

According to the present invention there is provided a pad assembly comprising a multiplicity of flexible sheets each having a band of repositionable pressure sensitive adhesive coated on its rear surface adjacent to and spaced by a small predetermined spacing from a first edge and spaced by a large predetermined spacing from a second opposite edge. The sheets are disposed in a stack with the corresponding edges of the sheets aligned, the front and rear surfaces of adjacent sheets facing each other, and the band of repositionable pressure sensitive adhesive on each sheet adhering it to the adjacent sheet in the stack. A layer of padding compound is disposed over and adhered to the aligned first edges of the sheets in the stack. The padding compound is sufficiently flexible to allow, after the band of repositionable pressure sensitive adhesive on the rear surface of one of the sheets in the stack is separated from the front surface of the adjacent sheet in the stack, that one sheet (and any sheets above it) to be pivoted away from that adjacent sheet by hinge-like flexing of the padding compound between the sheets. The padding compound will remain adhered to the adjacent sheets during such flexing while affording manual peeling of that one sheet from the padding compound to separate that one sheet from the stack. The small predetermined spacing between the band of repositionable pressure sensitive adhesive and the first edge of each sheet provides a tactile feel when the band of repositionable pressure sensitive adhesive on the rear surface of one of the sheets in the stack has been separated from the front surface of the adjacent sheet in the stack by manual peeling apart of the sheets, which tactile feel allows the user to reduce the peeling force being manually applied to the sheet and thereby restricts inadvertent separation of that sheet from the padding compound; and after that sheet is intentionally separated from the padding compound, the band of repositionable pressure sensitive adhesive on the sheet allows the user to removably adhere that sheet to a vertical support surface without the need to use tape, pins, or other separate attachment means.

The tactile feel that restricts inadvertent separation of that sheet from the padding compound is produced when that spacing is as little as 0.6 centimeter (0.25 inch) in a direction normal to the first edge of the sheet, and is well pronounced when that spacing is at least 1.2 centimeters (0.5 inch) or more. That spacing, however, preferably should not be greater than about 4 centimeters (1.5 inches) so that the portion of the sheet adjacent its first or top edge will be supported in a vertical position when a sheet is separated from the stack and adhered to a vertical surface by the band of repositionable pressure sensitive adhesive.

Preferably, when used as a flip chart, the pad assembly further includes a stiff back card to which the bottom most sheet in the stack is attached, which back card is at least coextensive with the sheets in the stack. That back card can have a top edge aligned with the first edges of the sheets, or, as illustrated herein, can have a top portion projecting past the aligned first edges of the sheets, which top portion has a peripheral support edge generally parallel to the first edges of the sheets over which support surface one or more of the sheets in the pad can be supported after they are peeled away from the adjacent underlying sheet. The top portion of the back card can have an elongate opening generally aligned with and spaced from that support edge with the part of the top portion between the opening and that support edge providing a handle by which the pad assembly can easily be moved from place to place. To provide space for that opening the top portion of the back card should project in the range of about 5 to 10 centimeters (2 to 4 inches) past the first edges of the sheets. Also, the top portion of the back card can have two aligned parallel elongate through slots positioned adjacent opposite sides of the back card and adapted to receive the support pegs on some types of easels on which the pad assembly might be supported.

BRIEF DESCRIPTION OF DRAWING

The present invention will be further described with reference to the accompanying drawing wherein like reference numerals refer to like parts in the several views, and wherein.

DETAILED DESCRIPTION

Figure 1:
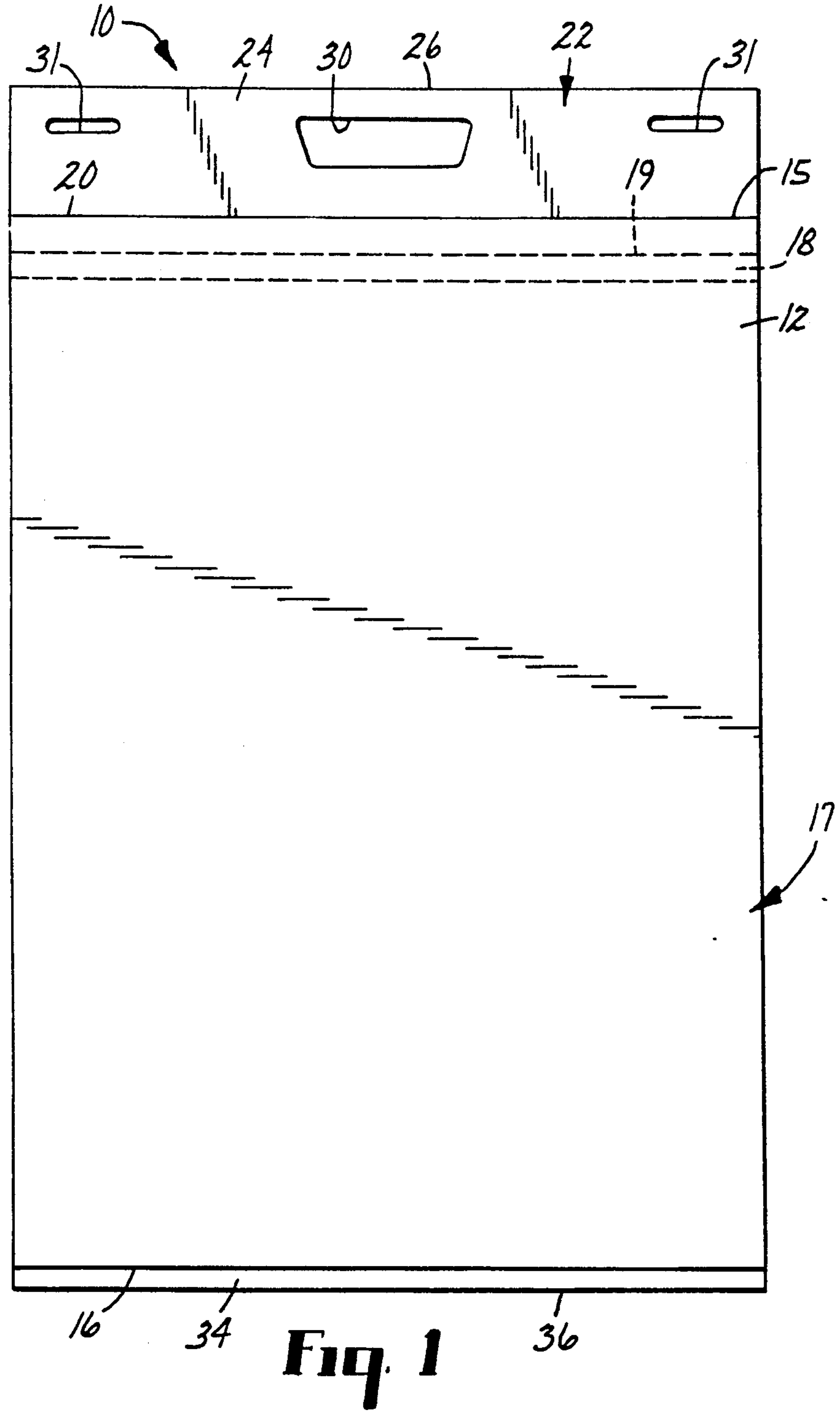
FIG. 1 is a front view of a pad assembly according to the present invention.

Referring now to the drawing, there is shown a pad assembly according to the present invention generally designated by the reference numeral 10, which pad assembly 10 is in an embodiment sometimes called a "flip chart" or an "easel pad" which can be supported on a support such as an easel (not shown) at the front of the room during a meeting and used to record lists of items or ideas generated during the meeting.

Figure 3:
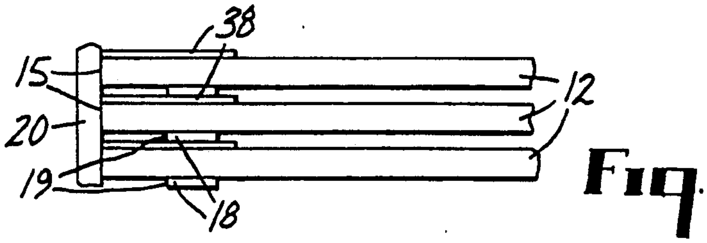
FIG. 3 is a fragmentary much enlarged side view of three sheets and the means by which they are attached together in the pad assembly of FIG. 1.

Generally the pad assembly 10 comprises (1) a multiplicity of flexible sheets 12 (e.g., 30 sheets 12), each sheet 12 being generally of the same size, having front and rear surfaces, having peripheral edges including first and second opposite edges 15 and 16, having a band 18 (see FIG. 3) of repositionable pressure sensitive adhesive coated on the rear surface adjacent to and spaced by a small predetermined spacing from the first edge 15 and spaced by a large predetermined spacing from the second edge 16, the sheets 12 being disposed in a stack 17 with the corresponding peripheral edges of the sheets 12 aligned, the front and rear surfaces of adjacent sheets 12 facing each other, and the band 18 of repositionable pressure sensitive adhesive on each sheet 12 adhering that sheet 12 to the adjacent sheet 12 in the stack 17; and (2) a layer 20 of padding compound disposed over and releasably adhered to the aligned first edges 15 of the sheets 12 in the stack 17. The layer 20 of padding compound is sufficiently flexible to allow, after the band 18 of repositionable pressure sensitive adhesive on the rear surface of one of the sheets 12 in the stack 17 is separated from the front surface of the adjacent sheet 12 in the stack 17, that one sheet 12 to be pivoted away from that adjacent sheet 12 by hinge-like flexing of the layer 20 of padding compound between the sheets 12, while the layer 20 of padding compound will remain adhered to the adjacent sheets 12 during such flexing while affording manual peeling of that one sheet 12 from the layer 20 of padding compound to separate that one sheet 12 from the stack 17.

The layer 20 of padding compound can be formed with any of several commercially available adhesive padding compound materials, such as "Merit" padding adhesive from Merrit Pad Co., Plainsville, Ohio; "Hurst Graphics" padding compound from Hurst Graphics, Los Angeles, Calif.; or "Champadco" padding cement from Champion Mfg. Co., Charlotte, N.C.

The sheets 12 can be of paper that weighs 18 pounds per ream 17 inch by 22 inch by 500 inch in size, such as the paper commercially designated "Form Run Bond" that is available from Georgia Pacific, Kalamazoo, Mich., and may, for example, have a dimension between the first and second edges 15 and 16 of about 775 millimeters (30.5 inches) and a width in a direction parallel to the first and second edge 15 and 16 of about 580 millimeters (22.8 inches).

The small predetermined spacing between the first edge 15 of each sheet 12 to which the layer 20 of padding compound is adhered and the adjacent edge 19 of the band 18 of repositionable pressure sensitive adhesive on each sheet 12 provides a tactile feel when the the band 18 of repositionable pressure sensitive adhesive on the rear surface of one of the sheets 12 in the stack 17 separates from the front surface of the adjacent sheet 12 in the stack 17 as the sheets are manually peeled apart. That tactile feel allows the person applying the peeling force to reduce or terminate it and thereby restricts inadvertent separation of that sheet 12 from the layer 20 of padding compound. For sheets 12 of the dimensions indicated above, the tactile feel that restricts inadvertent separation of one of the sheets 12 from the layer 20 of padding compound is most pronounced and effective when that spacing is at least 1.2 centimeters (0.5 inch) or more in a direction normal to the first edge 15 of the sheet 12, however the tactile feel is produced for sheets of that size when that spacing is as little as 0.6 centimeter (0.25 inch). After one of the sheets 12 is intentionally separated from the layer 20 of padding compound, the band 18 of repositionable pressure sensitive adhesive affords removably adhering that sheet 12 to a vertical support surface.

The pad assembly 10 further includes a back card 22 of a stiff material (e.g., rigid cardboard or chipboard 864 millimeters (34 inches) high by 580 millimeters (22.8 inches) wide) having a front surface to which the rear surface of the bottom most sheet 12 in the stack 17 is attached. The front surface of the back card 22 is coextensive with the sheets 12 in the stack 17, and the back card 22 has a top portion 24 projecting past the aligned first edges 15 of the sheets 12. The top portion 24 has a peripheral support edge 26 generally parallel to the first edges 15 of the sheets 12 preferably spaced about 9 centimeters (3.5 inches) from the first edges 15 of the sheets 12, over which support edge 26 one or more of the sheets 12 in the stack 17 can be supported after the bands 18 of pressure sensitive on those sheets 12 have been peeled away from the adjacent underlying sheet 12 and those sheets 12 are bent back over the support edge 26. The top portion 24 has an elongate through opening 30 generally aligned with and spaced from the support edge 26 with the part of the top portion 24 between the opening 30 and the support edge 26 providing a handle for the pad assembly 10 by which the pad assembly 10 can conveniently be manually moved around. Also, the top portion 24 has two aligned, parallel elongate through slots 31 positioned adjacent opposite sides of the back card 22 and aligned parallel to the support edge 26, the slots 31 being adapted to receive the support pegs on some types of easels on which the pad assembly 10 might be supported.

The back card 22 also has a bottom portion 34 projecting past the aligned second edges 16 of the sheets 12. The bottom portion 34 has a peripheral supported edge 36 generally parallel to the second edges 16 of the sheets 12 and spaced in the range of about 0.6 to 2.5 centimeters (0.25 to 1 inch) and preferably about 1.3 centimeters (0.5 inch) from the second edges 16 of the sheets 12, which supported edge 36 is adapted to be supported on a support surface such as on the support ledge of an easel while the bottom portion 34 spaces the second edges 16 of the sheets 12 sufficiently from that support surface to afford easy manual access to the sheets 12 as may be needed to use the pad assembly 10.

Preferably the band 18 of repositionable pressure sensitive adhesive that extends parallel to the first edge 15 is continuous, and has a width in a direction normal to the first edge 15 in the range of 3.75 to 6.25 centimeters (1.5 to 2.5 inches), with that band 18 preferably being about 5 centimeter (2 inches) wide. Alternatively, however, the band 18 of repositionable pressure sensitive adhesive could comprise a plurality of spaced areas coated with pressure sensitive adhesive that also has a width in a direction normal to the first edge 15 in that range.

While the repositionable pressure sensitive adhesive used to form the band 18 could be of the type used on "Post-it" brand notes that is described in U.S. Pat. No. 3,691,140, the content whereof is incorporated herein by reference, preferably the repositionable pressure sensitive adhesive is an adhesive containing collapsed hollow microspheres of the type described in U.S patent application Ser. No. 276,767 filed Nov. 30, 1988 now U.S. Pat. No. 5,045,569 the content whereof is incorporated herein by reference. Briefly, the hollow microspheres in the adhesive are predominantly iso-octyl acrylate, with a minor portion of a more polar comonomer, and are polymerized in generally spherical shapes with small fluid filled inclusions. When the adhesive is coated on the sheets 12 to form the bands 18, the fluid filling the inclusions evacuates, and the microspheres collapse as they dry compared to solid microspheres which dry to a more or less spherical shape. When dry, the hollow collapsed microspheres in the adhesive are pancake like in shape. Preferably, the pressure sensitive adhesive in the bands 18 comprises hollow collapsed microspheres consisting of a 94/6 ratio of iso-octyl acrylate to acrylic acid with diameters of about 60 microns. The adhesive containing the hollow collapsed microspheres provides advantages compared to adhesives containing solid microspheres. The hollow collapsed microspheres adhere well to the sheets 12 without the use of special primers so that few of the collapsed micospheres will transfer from the sheets 12 to a surface to which the sheets 12 are temporarily adhered by the bands 18 of adhesive. Also, the hollow collapsed microspheres provide relatively high adhesive shear strength. (i.e., "shear strength" is a measure of the cohesiveness or internal strength of an adhesive. That internal strength is measured by determining the amount of force required to pull an adhesive coated strip or sheet from a standard flat surface in a direction parallel to that surface to which the adhesive on the strip has been affixed with definite pressure, and is measured in time required to pull a standard area of adhesive coated material from that surface under the stress of a constant, standard load). The shear strength of the preferred adhesive containing the hollow collapsed microspheres is significantly greater than that needed for good adhesion to smooth wall surfaces, and allows the sheets 12 to be removably attached for a long period of time to many wall surfaces that are irregular and/or uneven.

The portion of the front surface of each sheet 12 to which the band of adhesive 18 on the adjacent sheet is adhered to help retain the sheets 12 in the stack 17 is coated with a layer 38 of a suitable back sizing material (see FIG. 3) to provide a desired releasable level of adhesion between the band of adhesive 18 and the adjacent sheet 12, which back sizing material for the preferred pressure sensitive adhesive described above can be that described in U.S. Pat. No. 2,532,011, the content whereof is incorporated herein by reference.

A test was performed to compare the ability of bands 18 of the preferred adhesive described above to adhere sheets 12 to various surfaces compared to sheets of the same size adhered with the same sized bands of the adhesive used on "Post-it" brand notes and the bands of adhesive on the sheets from the "Clingers" brand note pad assembly commercially available from the Ampad Corporation that is described above. The surfaces to which the test sheets were adhered were those of painted metal and painted painted sheet rock which were both very smooth, the surface of the fabric commonly used on modular partitions sold by the Steelcase Office Furniture Company, Grand Rapids, Mich., which is commercially designated "Aria" by that company and which is relatively rough compared to fabric used in wearing apparel but relatively smooth compared to many other fabrics used to cover walls, and the surface of a porous concrete block that had many deep pits on an otherwise fairly flat surface and had been painted. The results were as follows:

| Sample | Painted Metal | Painted Sheet rock | Cubicle Fabric | Painted Concrete Block |
|---|---|---|---|---|
| Sheets from | 4+ days | 3-4 days | 1 minute | 1-1.5 minutes |

-continued

| Sample | Painted Metal | Painted Sheet rock | Cubicle Fabric | Painted Concrete Block |
|---|---|---|---|---|
| Ampad's "Clingers" pad assembly | | | | |
| Sheets having bands of the adhesive used on "Post-it" brand notes | 4+ days | 4+ days | 20-30 min. | 10-15 min. |
| Sheets 12 with bands of the preferred adhesive described above | 4+ days | 4+ days | 4+ days | 3-7 days |

As can be seen from these test results, sheets 12 with bands 18 of the preferred adhesive containing collapsed hollow microspheres that is described above hung for long periods of time on either rough or smooth surfaces. On the cubicle fabric, they hung for over four days compared to only one half hour for the next best sample. On painted concrete, the toughest surface to stick to due to reduced surface contact, the sheets with bands 18 of the preferred adhesive containing collapsed hollow microspheres hung at least three days compared to less than fifteen minutes for the next best sample.

After writing on the front surface of the top sheet 12 in the pad assembly if he chooses to do so, a user of the pad assembly 10 can peel the band of adhesive 18 on that top sheet 12 away from the second sheet 12 in the pad assembly 10 by pulling on the top sheet 12 adjacent its second edge 16 in a direction generally at a right angle to the front surface of the underlying sheet 12. Tension in the top sheet 12 caused by such pulling will progressively peel the band 18 of adhesive from the underlying sheet 12, and the user will feel the top sheet 12 move much more easily away from the underlying sheet 12 as the last portion of the band 18 separates from the underlying sheet 12, thereby providing the user with a tactile signal that he should stop pulling on the sheet 12 if he does not wish to separate the top sheet 12 from the pad assembly 10. If the user does not wish to remove the top sheet 12 from the pad assembly 10, he can then stop pulling on the sheet and bend the top sheet 12 back over the support edge 26 on the top portion 24 of the back card 22, whereupon the layer 20 of padding compound will bend between the top sheet 12 and the underlying sheet 12 completely exposing the front surface of the underlying sheet while the layer 20 of padding compound remains adhered to the top sheet supported over the support edge 26. If the user wishes to remove the top sheet 12 from the pad assembly he can simply peel its first edge 15 away from the layer 20 of padding compound from which the top sheet will separate cleanly leaving a smooth first edge 15 on the separated sheet 12, whereupon the user may releasably adhere the removed sheet to a vertical support surface using the band 18 of pressure sensitive adhesive. After the uppermost sheet 12 is either bent back over the support edge 26 or removed, a user may similarly peel away each successive underlying sheet 12 and either also bend it back over the support edge 26 or remove it from the pad assembly 10. Subsequently, if desired, the user can reposition any sheets 12 bent back over the support edge 26 in their original position on the pad and re adhere them to the underlying sheet 12 on the pad using the bands 18 of adhesive. Also, a user can remove a number of sheets 12 from the pad assembly while leaving them adhered together, whereupon the user can adhere those removed sheets to a surface using the band 18 of adhesive on the bottom most sheet 12 so that the user now in effect has two pad assemblies from which individual sheets 12 can be peeled away and treated in the manners described above. The bands 18 of adhesive will provide good adhesion to even rough vertical support surfaces, such as those of cloth or painted cement blocks, while affording clean removal of the sheets from all surfaces without leaving adhesive residue or damaging the surface such as by removing paint, paper, or fabric from the surfaces.

Figure 2:
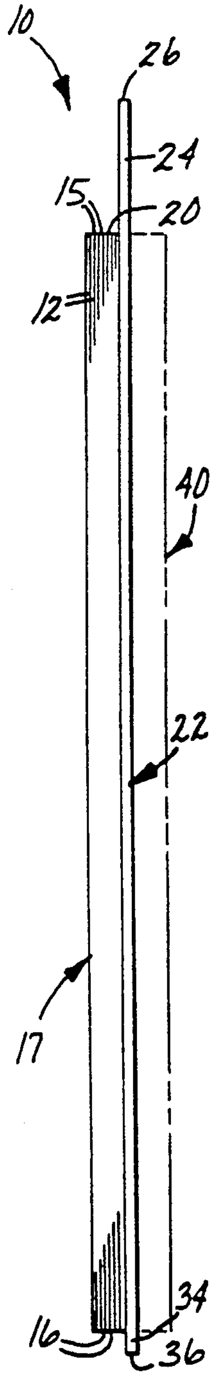
FIG. 2 is a side view of the pad assembly of FIG. 1.

As an alternative to including only the stack 17 of sheets 12, if desired, the pad assembly according to the present invention can further include a second stack 40 of sheets as is illustrated in dotted outline in FIG. 2, which second stack 40 includes sheets identical to the sheets 12 attached together by bands of repositionable pressure sensitive adhesive (not shown) and a layer of padding compound (not shown) disposed in the same locations and serving the same functions in the second stack 40 as the bands 18 of repositionable pressure sensitive adhesive and the layer 20 of padding compound serve on the stack 17 of sheets 12 attached to the front surface of the the back card 22. The second stack of sheets is attached to the rear surface of the back card 22 in a position generally opposite the stack 17 of sheets 12 attached to the front surface of the back card 22.

The present invention has now been described with reference to one embodiment thereof. It will be apparent to those skilled in the art that many changes can be made in the embodiment described without departing from the scope of the present invention. For example, pads having some of the claimed structural combinations with sizes similar to those of conventional pads of "Post-it" brand notes available from Minnesota Mining and Manufacturing Company may be useful for some purposes. Thus the scope of the present invention should not be limited to the structure described in this application, but only by structures described by the language of the claims and the equivalents of those structures.

We claim:

1. A pad assembly comprising:

a multiplicity of flexible sheets, each sheet being generally of the same size, having front and rear surfaces, having peripheral edges including first and second opposite edges, having a band of repositionable pressure sensitive adhesive coated on said rear surface adjacent to and spaced by a small predetermined spacing from said first edge and spaced by a large predetermined spacing from said second edge, said sheets being disposed in a stack with the corresponding peripheral edges of the sheets aligned, the front and rear surfaces of adjacent sheets facing each other, and the band of repositionable pressure sensitive adhesive on each sheet adhering that sheet to the adjacent sheet in the stack; and a layer of padding compound disposed over and releasably adhered to the aligned first edges of the sheets in the stack, said padding compound being sufficiently flexible to allow, after the band of repositionable pressure sensitive adhesive on the rear surface of one of the sheets in the stack is separated from the front surface of the adjacent sheet in the stack, that one sheet to be pivoted away from that adjacent sheet by hinge-like flexing of the padding compound between the sheets, and said layer of padding compound being sufficiently adhered to the sheets to remain adhered to the adjacent sheets during such flexing while affording manual peeling of the one sheet from the padding compound to separate that one sheet from the stack, said small predetermined spacing between said band of repositionable pressure sensitive adhesive and said first edge being at least 0.6 centimeter (0.25 inch) wide in a direction normal to said first edge and providing a tactile feel when the band of repositionable pressure sensitive adhesive on the rear surface of one of the sheets in the stack is separated from the front surface of the adjacent sheet in the stack by manual peeling apart of the sheets that allows the peeling force being manually applied to be terminated and thereby restricts inadvertent separation of that sheet from the padding compound, and the said band of repositionable pressure sensitive adhesive afford removable supporting adhesion of one of the sheets separated from the stack to a vertical support surface.

2. A pad assembly according to claim 1 wherein said small predetermined spacing between said band of repositionable pressure sensitive adhesive and said first edge is at least 1.2 centimeter (0.5 inch) wide in a direction normal to said first edge.

3. A pad assembly according to claim 1 wherein said band of repositionable pressure sensitive adhesive is continuous, extends parallel to said first edge, and has a width in direction normal to said first edge in the range of 3.8 to 6.4 centimeters (1.5 to 2.5 inches).

4. A pad assembly according to claim 1 wherein said band of repositionable pressure sensitive adhesive comprises a plurality of spaced areas coated with pressure sensitive adhesive and extends parallel to said first edge.

5. A pad assembly according to claim 1 further including a stiff back card having a front surface, the rear surface of the bottom most sheet in the stack being attached to the front surface of the back card, and the front surface of the back card being at least coextensive with the sheets in the stack.

6. A pad assembly according to claim 1 wherein said repositionable pressure sensitive adhesive comprises hollow collapsed microspheres consisting of a 94/6 ratio of iso-octyl acrylate to acrylic acid with diameters of about 60 microns.

7. A pad assembly comprising:

a multiplicity of flexible sheets, each sheet being generally of the same size, having front and rear surfaces, having peripheral edges including first and second opposite edges, having a band of repositionable pressure sensitive adhesive coated on said rear surface adjacent to and spaced by a small predetermined spacing from said first edge and spaced by a large predetermined spacing from said second edge, said sheets being disposed in a stack with the corresponding peripheral edges of the sheets aligned, the front and rear surfaces of adjacent sheets facing each other, and the band of repositionable pressure sensitive adhesive on each sheet adhering that sheet to the adjacent sheet in the stack; and a layer of padding compound disposed over and releasably adhered to the aligned first edges of the sheets in the stack, said padding compound being sufficiently flexible to allow, after the band of repositionable pressure sensitive adhesive on the rear surface of one of the sheets in the stack is separated from the front surface of the adjacent sheet in the stack, that one sheet to be pivoted away from that adjacent sheet by hinge-like flexing of the padding compound between the sheets, and said layer of padding compound being sufficiently adhered to the sheets to remain adhered to the adjacent sheets during such flexing while affording manual peeling of the one sheet from the padding compound to separate that one sheet from the stack, said small predetermined spacing between said band of repositionable pressure sensitive adhesive and said first edge providing a tactile feel when the band of repositionable pressure sensitive adhesive on the rear surface of one of the sheets in the stack is separated from the front surface of the adjacent sheet in the stack by manual peeling apart of the sheets that allows the peeling force being manually applied to be terminated and thereby restricts inadvertent separation of that sheet from the padding compound, and the said band of repositionable pressure sensitive adhesive affords removable supporting adhesion of one of the sheets separated from the stack to a vertical support surface;

said pad assembly further including a stiff back card having a front surface, the rear surface of the bottom most sheet in the stack being attached to the front surface of the back card, and the front surface of the back card being at least coextensive with the sheets in the stack, said back card having a top portion projecting past the aligned first edges of said sheets, said top portion having a peripheral support edge generally parallel to said first edges of said sheets spaced in the range of about 5 to 10 centimeters (2 to 4 inches) from said first edges of said sheets, and said top portion having an elongate opening generally aligned with and spaced from said peripheral edge of said top portion with the part of said top portion between said opening and said support edge providing a handle for said pad assembly.

8. A pad assembly according to claim 7 wherein said sheets have a dimension between said first and second edges of about 775 millimeters (30.5 inches) and a width in a direction parallel to said first and second edges of about 580 millimeters (22.8 inches).

9. A pad assembly according to claim 7 wherein said back card has a rear surface opposite said front surface, and said pad assembly includes a second stack of sheets attached together by bands of repositionable pressure sensitive adhesive and a layer of padding compound disposed in the same location in said second stack as said bands of repositionable pressure sensitive adhesive and said layer of padding compound on said stack attached to the front surface of the said back card, said second stack being attached to the rear surface of said back card in a position generally opposite said stack attached to the front surface of said back card.

10. A pad assembly comprising:

a multiplicity of flexible sheets, each sheet being generally of the same size, having front and rear surfaces, having peripheral edges including first and second opposite edges, having a band of repositionable pressure sensitive adhesive coated on said rear surface adjacent to and spaced by a small predetermined spacing from said first edge and spaced by a large predetermined spacing from said second edge, said sheet being disposed in a stack with the corresponding peripheral edges of the sheets aligned, the front and rear surfaces of adjacent sheets facing each other, and the band of repositionable pressure sensitive adhesive on each sheet adhering that sheet to the adjacent sheet in the stack; and a layer of padding compound disposed over and releasably adhered to the aligned first edges of the sheets in the stack, said padding compound being sufficiently flexible to allow, after the band of repositionable pressure sensitive adhesive on the rear surface of one of the sheets in the stack is separated from the front surface of the adjacent sheet in the stack, that one sheet to be pivoted away from that adjacent sheet by hinge-like flexing of the padding compound between the sheets, and said layer of padding compound being sufficiently adhered to the sheets to remain adhered to the adjacent sheets during such flexing while affording manual peeling of the one sheet from the padding compound to separate that one sheet from the stack, said small predetermined spacing between said band of repositionable pressure sensitive adhesive and said first edge providing a tactile feel when the band of repositionable pressure sensitive adhesive on the rear surface of one of the sheets in the stack is separated from the front surface of the adjacent sheet in the stack by manual peeling apart of the sheets that allows the peeling force being manually applied to be terminated and thereby restricts inadvertent separation of that sheet from the padding compound, and the said band of repositionable pressure sensitive adhesive affords removable supporting adhesion of one of the sheets separated from the stack to a vertical support surface;

said pad assembly further including a stiff back card having a front surface, the rear surface of the bottom most sheet in the stack being attached to the front surface of the back card, and the front surface of the back card being at least coextensive with the sheets in the stack, said back card having a top portion projecting past the aligned first edges of said sheets, said top portion having a peripheral support edge generally parallel to said first edges of said sheets spaced in the range of about 5 to 10 centimeters (2 to 4 inches) from said first edges of said sheets, and said sheets having a dimension between said first and second edges of about 775 millimeters (30.5 inches) and a width in a direction parallel to said first and second edges of about 580 millimeters (22.8 inches).

11. A pad assembly comprising:

a multiplicity of flexible sheets, each sheet being generally of the same size, having front and rear surfaces, having peripheral edges including first and second opposite edges, having a band of repositionable pressure sensitive adhesive comprising hollow collapsed microspheres of polymeric material coated on said rear surface adjacent to and spaced by a small predetermined spacing from said first edge and spaced by a large predetermined spacing from said second edge, said sheets being disposed in a stack with the corresponding peripheral edges of the sheets aligned, the front and rear surfaces of adjacent sheets facing each other, and the band of repositionable pressure sensitive adhesive on each sheet adhering that sheet to the adjacent sheet in the stack; and a layer of padding compound disposed over and releasably adhered to the aligned first edges of the sheets in the stack, said padding compound being sufficiently flexible to allow, after the band of repositionable pressure sensitive adhesive on the rear surface of one of the sheets in the stack is separated from the front surface of the adjacent sheet in the stack, that one sheet to be pivoted away from that adjacent sheet by hing-like flexing of the padding compound between the sheets, and said layer of padding compound being sufficiently adhered to the sheets to remain adhered to the adjacent sheets during such flexing while affording manual peeling of the one sheet from the padding compound to separate that one sheet from the stack, said small predetermined spacing between said band of repositionable pressure sensitive adhesive and said first edge providing a tactile feel when the band of repositionable pressure sensitive adhesive on the rear surface of one of the sheets in the stack is separated from the front surface of the adjacent sheet in the stack by manual peeling apart of the sheets that allows the peeling force being manually applied to be terminated and thereby restricts inadvertent separation of that sheet from the padding compound, and the said band of repositionable pressure sensitive adhesive affords removable supporting adhesion of one of the sheets separated from the stack to a vertical support surface.

12. A pad assembly comprising:

a multiplicity of flexible sheets, each sheet being generally of the same size, having front and rear surfaces, having peripheral edges including first and second opposite edges, having a band of repositionable pressure sensitive adhesive coated on said rear surface adjacent to and spaced by a small predetermined spacing from said first edge and spaced by a large predetermined spacing from said second edge, said sheets being disposed in a stack with the corresponding peripheral edges of the sheets aligned, the front and rear surfaces of adjacent sheets facing each other, and the band of repositionable pressure sensitive adhesive on each sheet adhering that sheet to the adjacent sheet in the stack; and a layer of padding compound disposed over and releasably adhered to the aligned first edges of the sheets in the stack, said padding compound being sufficiently flexible to allow, after the band of repositionable pressure sensitive adhesive on the rear surface of one of the sheets in the stack is separated from the front surface of the adjacent sheet in the stack, that one sheet to be pivoted away from that adjacent sheet by hinge-like flexing of the padding compound between the sheets, and said layer of padding compound being sufficiently adhered to the sheets to remain adhered to the adjacent sheets during such flexing while affording manual peeling of the one sheet from the padding compound to separate that one sheet from the stack, said small predetermined spacing between said band of repositionable pressure sensitive adhesive and said first edge providing a tactile feel when the band of repositionable pressure sensitive adhesive on the rear surface of one of the sheets in the stack is separated from the front surface of the adjacent sheet in the stack by manual peeling apart of the sheets that allows the peeling force being manually applied to be terminated and thereby restricts inadvertent separation of that sheet from the padding compound, and the said band of repositionable pressure sensitive adhesive affords removable supporting adhesion of one of the sheets separated from the stack to a vertical support surface;

said pad assembly further including a stiff back card having a front surface, the rear surface of the bottom most sheet in the stack being attached to the front surface of the back card, and the front surface of the back card being at least coextensive with the sheets in the stack, said back card having a top portion projecting past the aligned first edges of said sheets, said top portion having a peripheral support edge generally parallel to said first edges of said sheets, and said top portion having two parallel elongate through slots positioned adjacent opposite sides of the back card and aligned parállel to said support edge, said slots being adapted to receive the support pegs on some types of easels on which said pad assembly might be supported.

* * * * *